United States Patent [19]

Wright

[11] 4,226,511
[45] Oct. 7, 1980

[54] FILM STRIP/AUDIO TAPE ARRANGEMENT FOR AUDIO-VISUAL CASSETTE

[75] Inventor: Joseph H. Wright, Marbelhead, Mass.

[73] Assignee: Polaroid Corporation, Cambridge, Mass.

[21] Appl. No.: 32,947

[22] Filed: Apr. 24, 1979

[51] Int. Cl.³ .......................................... G03B 23/02
[52] U.S. Cl. ................................. 352/72; 352/130; 352/31; 352/78 R
[58] Field of Search ................. 352/27, 29, 78 R, 72, 352/130, 31; 242/55.16, 180, 181, 205

[56] References Cited

U.S. PATENT DOCUMENTS

| | | |
|---|---|---|
| 1,843,972 | 2/1932 | DeForest . |
| 1,893,698 | 1/1933 | Crespinel . |
| 1,957,525 | 5/1934 | Brown et al. . |
| 2,962,927 | 12/1960 | Warren . |
| 3,240,329 | 3/1966 | Custin . |
| 3,352,204 | 11/1967 | Staar . |
| 3,362,771 | 1/1968 | Rodda ..................................... 352/5 |
| 3,378,328 | 4/1968 | Custin ................................... 352/31 |
| 3,650,610 | 3/1972 | Ajar ....................................... 352/31 |
| 3,674,345 | 7/1972 | Chernotsky et al. ................... 352/31 |
| 3,895,862 | 7/1975 | Stella et al. .......................... 352/130 |

OTHER PUBLICATIONS

U.S. Pat. Application Ser. No. 869,131, filed 1/13/78.

*Primary Examiner*—Monroe H. Hayes
*Attorney, Agent, or Firm*—Frederick A. Goettel, Jr.

[57] ABSTRACT

An audio-visual cassette system is provided employing a photographic film strip and an audio tape interwound on a common supply spool and adapted to be advanced along different paths from the supply spool to a takeup spool. The cassette is of the type in which the film strip may be exposed, processed and projected for viewing without removal from the cassette. The film strip is provided with an aperture in the supply spool leader which cooperates with a processor actuating pull strip to initiate processing of the film upon film advancement. The audio tape is coupled to the film strip at the supply spool end at a location with respect to the aperture such that the film strip pulls the tape away from the aperture region of the film during engagement of the pull strip with the aperture.

2 Claims, 2 Drawing Figures

FILM STRIP/AUDIO TAPE ARRANGEMENT FOR AUDIO-VISUAL CASSETTE

BACKGROUND OF THE INVENTION

This invention relates to an audio-visual system and, more particularly, to an improved sound motion picture system employing a multipurpose, photographic film handling cassette. Multipurpose motion picture cassettes from which the film need not be removed during exposure, processing and projection operations are described in prior U.S. Pat. Nos. 3,615,127 of Edwin H. Land, issued Oct. 26, 1961; 3,600,071 issued to Rogers B. Downey on Aug. 17, 1971; and 3,895,862 issued to Joseph A. Stella, et al. on July 22, 1975. Each of the systems described in the aforementioned patents employ a cassette from which the film need not be removed during exposure, processing and projection operations. In these systems, the cassette is operated in the camera for exposure of the film strip and then subsequently the cassette is loaded into a projector apparatus which first subjects the cassette to a sequence of operations which process the film strip to a viewable condition and then subsequently projects the developed recorded images.

Advantageously, audio operations may also be included in the described cassette system. Exemplary of such an audio-visual system is that described in prior U.S. Pat. No. 3,604,790 of Edwin H. Land, et al. issued Sept. 14, 1971 and U.S. Pat. No. 3,856,387 of William R. Wray, et al. issued Dec. 24, 1974. These latter patents describe a film handling cassette in which the film is permanently retained during sound recording and playback as well as exposure, processing and projection operations. In the latter arrangement, a magnetic sound recording track is included along one or both of the longitudinal borders of the film strip. While these systems provide generally acceptable audio reproduction, the inherent restriction of the narrow width of the audio tracks, which cannot be allowed to interfere with the image retaining portion of the film strip lying therebetween, limits the level of sound quality which may be achieved or, conversely, substantially increases the sophistication and cost of the sound apparatus necessary for high fidelity stereo reproduction.

A preferred solution to this problem is shown in copending U.S. patent application Ser. No. 869,131 assigned to the assignee of the present invention, which application describes an arrangement wherein a photographic film strip and an audio information bearing tape are interwound on a common supply spool and simultaneously unwound from the spool and advanced synchronously along separate paths such that different operational functions may be provided on the film and the tape as they progress along their different paths. In the preferred embodiment, both the film strip and the second tape are substantially retained within a multipurpose film cassette of the type described above while they are advanced along different, diverging paths from the supply spool to a separate takeup spool where they are again interwound with one another.

Such multipurpose film cassettes also include a processing means which is initially sealed by a tear tab which is adapted to be removed by advancement of the tab upon completion of film exposure so as to release processing fluid contained within a cassette-contained reservoir for deposit on the film strip. The tear tab includes a latching formation at a free end thereof configured to pass through and interlock with a necked-down aperture provided in the film strip so as to be advanced with the film strip thereby removing the tear tab and releasing the processing fluid. The tear tab engaging aperture is located in the film strip at the end thereof which is attached to the supply spool. Because both the film and tape are attached to the supply spool, the audio tape, in its advancement along its different path, is substantially adjacent to the film strip in this region and, during this initiation of the processing operation the tape has been found to interfere with the desired interlocking of the tear tab with the film strip aperture. Such interference may occur whether the tape is provided with a mating aperture of its own or whether no aperture is provided in the tape at this location.

SUMMARY OF THE INVENTION

The present invention provides a photographic film handling cassette of the type described hereinabove containing a strip of photographic film to be exposed and processed without removal from the cassette. The film is connected at opposite ends to supply and takeup spools upon which the film strip may be alternately wound upon advancement of the film strip along a desired path. The cassette further includes a processing means which is initially sealed by a tear tab which may be removed by advancement thereof upon completion of the film exposure so as to release reservoir-contained processing fluid for deposit on the film strip. The tear tab is provided with a latching formation at a free end thereof which is configured to pass through and interlock with a necked-down aperture provided in the film strip. The necked-down aperture is located near the end of the film strip which is attached to the supply spool. The cassette further includes an audio information bearing tape which is interwound with the film strip upon the supply and takeup spools for advancement from one of said spools to the other along with the film strip. The audio tape is coupled to the film strip at a predetermined point, at the supply spool end of the film strip which is further along the length of the supply end of the film strip than the location of the pull strip engaging aperture. As a result, no audio tape lies adjacent the film strip aperture during the engagement of the pull strip with the aperture.

BRIEF DESCRIPTION OF THE DRAWINGS

The novel features that are considered characteristic of the invention are set forth with particularity in the appended claims. The invention itself, however, both as to its organization and its method of operation, together with additional advantages thereof will best be understood from the following description of the preferred embodiment when read in connection with the accompanying drawings wherein like numbers have been employed in the different figures to denote the same parts and wherein:

DESCRIPTION OF THE PREFERRED EMBODIMENT

Figure 1:
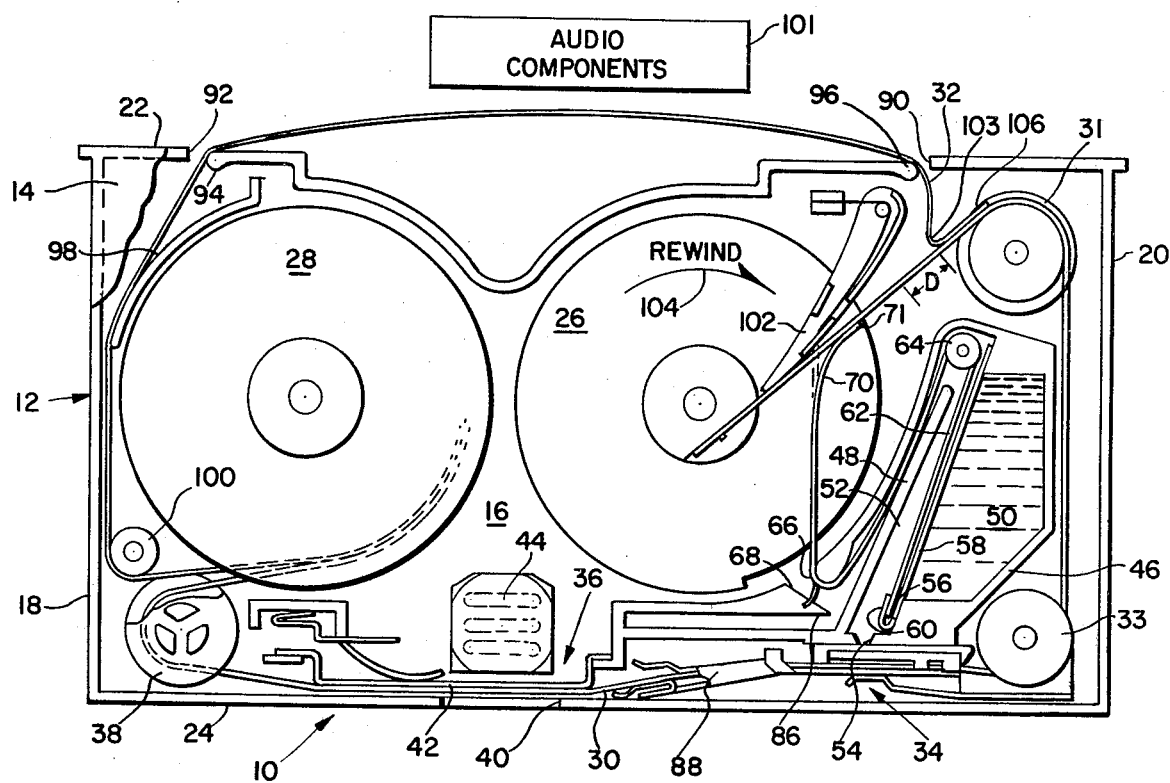
FIG. 1 is a diagrammatic view in elevation, partially cut away to show the interior of a compact, multipurpose audiovisual cassette employing an audio tape and photographic film strip configured according to the present invention.

In FIG. 1 of the drawings, a multipurpose audiovisual film/tape handling cassette 10 is illustrated in accordance with the invention. The cassette 10 comprises a generally parallelepiped casing or housing 12 constituted by a pair of planar side walls 14 and 16 joined together at their edges by end walls 18 and 20 and elongated top and bottom walls 22 and 24.

The illustrated cassete is a multipurpose cassette similar to that described in the aforementioned patents and copending application wherein the several operations of exposure, chemical processing, drying and projection of the recorded images is accomplished without transferring the photographic film from its cassette. In this structure, processing of the film is automatically initiated responsive to film movement at a given time during the cassette operation. To accomplish this, the film spools and the film itself are operatively associated with the processor as will later be explained in more detail.

As shown in FIG. 1, a supply spool or reel 26 and a takeup spool or reel 28, to which opposite ends of a photographic film strip or web 30 are affixed, are coplanarly mounted within housing 12 for rotation about parallel axes. In the arrangement of the invention, a magnetic tape strip 32 is coupled to the film strip in a manner to be described in detail hereinbelow so that it may be interwound on the supply spool 26 along with the photographic strip 30 to be synchronously advanced therefrom in accordance with rotation of the spool. Much, if not all, of the tape width, which approximates that of the film 30, is available for sound recording, thereby permitting spaced multiple recording tracks of high fidelity audio information. Advantageously, since both the film strip 30 and the tape 32 are coupled together near their respective ends, synchronization of the image and sound information is simplified as compared to non-connected strips. Stated otherwise, the fact that both are connected at one or both spools and wound together thereon provides synchronization information which is highly desirable.

As will be subsequently explained, both the photographic film strip 30 and the audio tape 32, while initially advanced together are subsequently advanced along different paths. In this regard, the path of the photographic film strip 30 which is substantially the same as that employed in the prior noted cassettes, will be first briefly explained. In its path from the supply reel 26, the film strip 30 first encounters a bobulator roller 31, engaging a portion of its periphery as shown, and passes therefrom to an idler roller 33 and then through a film processing station 34. Beyond the film processing station 34 the film 30 extends through an exposure/projection station 36, next passes around a snubber roller 38 and finally passes to the takeup reel 28. The exposure/projection station 36 includes an opening 40 at the bottom wall 24 of the cassette which functions to permit image forming light rays to impinge on the film strip when the cassette is operated in the camera and to subsequently permit light rays from an external source to be directed to the film strip outwardly of the cassette for the projection operations. To facilitate these functions, a pressure plate 42 and a prismatic reflector element 44 are mounted behind the opening 40.

The film processing station 34 is formed in part by internal cassette transverse wall formations 46 and 48 defining in part a pair of chambers 50 and 52, the latter of which opens at its bottom to the processing fluid applicator nozzle 54 positioned to overlie the emulsion bearing surface of the film strip 30 as it passes between the exposure/projection station 36 and the idler roller 33. The chamber 50 constitutes an initially sealed reservoir for processing fluid and opens along one upright side to the chamber 52 and a planar face 56 to which a releasable tear tab closure 58 is initially affixed by bonding or the like.

The tear tab 58 extends from the top of the chamber 50 downwardly over the planar face 56 to the bottom of the chamber near the nozzle 54. The tear tab is then reversely folded or bent at the bottom of the chamber 50 to establish an upwardly directed leading end portion 60 secured by bonding or other suitable means to one end of a pull strip extension 62.

The pull strip 62 extends upwardly from the lap joint with the tear tab closure 58 to a point adjacent the upper end of the interior cassette wall 46 where it passes around a first pull strip turning point 64 and extends downwardly to a second pull strip turning point 66 around which the pull strip passes in a second reverse bend to establish the essentially S-shaped configuration of the pull strip seen in FIG. 1. Prior to initiation of the processing cycle, the pull strip passes from the second turning point through an exit opening 68 where it extends upwardly so that the free end 70 of the pull strip is in contact with the outermost convolution of the film strip 30 carried by the supply spool 26 and is biased thereagainst by the memory of the resilient flexible pull strip.

Figure 2:
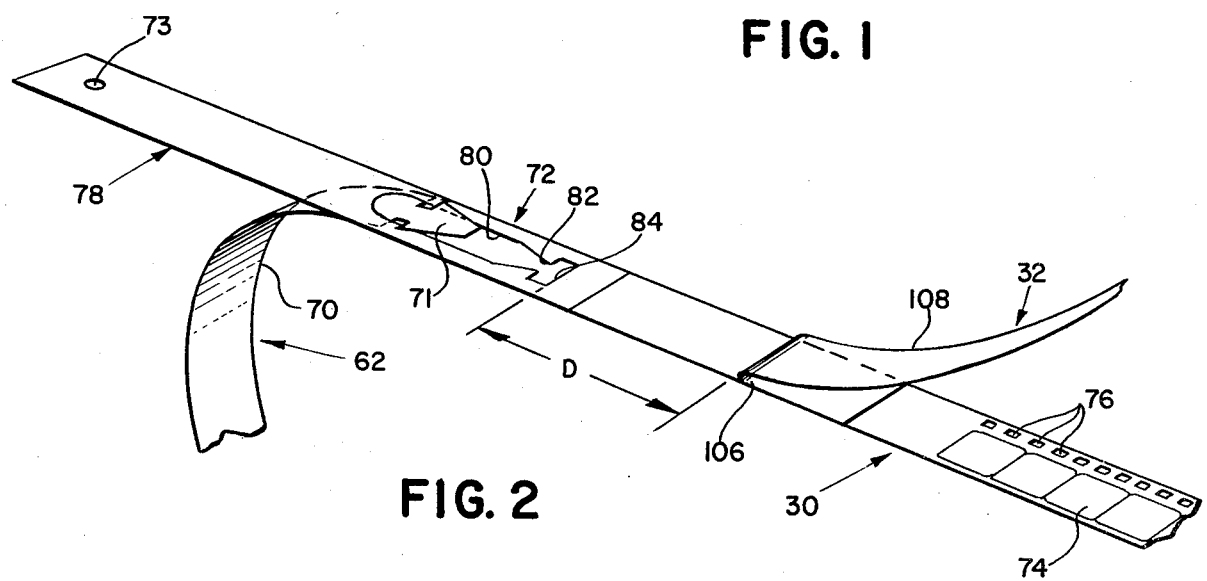
FIG. 2 is a perspective view of a film strip/audio tape assembly, according to the present invention, for use in the cassette of FIG. 1.

As best seen in FIG. 2, the free end portion 70 of the pull strip 62 is tapered and necked-down to provide a configuration 71 which is adapted to engage an aperture 72 provided in the supply end leader of the film strip 30 upon initial rewind of the film strip back onto the supply spool. Such an arrangement is described in detail in U.S. Pat. No. 3,895,862 issued July 22, 1975 to Joseph A. Stella, et al.

Referring again to FIG. 2, a portion of the film strip 30 which functions as an operating component in the cassette over and above its principal function of recording photographic images is shown. The film is provided with a major central portion 74 of usable film upon which projectable images may be formed, only a part of which is shown in the drawing. Also, a series of uniformly spaced sprocket holes 76 are provided along the length of the film to facilitate incremental film advance during exposure and projection. The length of the film strip extends beyond the major central portion 74 to form both a supply and a takeup leader, each having an aperture provided therein for permanent connection to the hubs of the supply and takeup spools. Only the supply leader end 78 and its supply spool attachment aperture 73 is shown in FIG. 2.

Again with reference to FIG. 2, the supply leader 78 of the film strip 30 is provided with a discontinuity, in its preferred embodiment an aperture 72 of bottle-shaped configuration, to provide a major aperture portion 80 extending in a direction away from the central film strip section 74 and connected by a necked-down portion 82 with an undercut or transverse slot-like portion 84. This film strip aperture 80 is sized such that the latching configuration 71 described in connection with the pull strip 60 of the processor will pass therethrough and become attached thereto and subsequent continued rewind rotation of the supply spool 26 will effect a pulling action on the pull strip 62 causing it to advance through its S-shaped tortuous path resulting in peeling of the tear tab closure 58 from the planar face 56 of the processing fluid reservoir 50 to release the processing fluid for application to the exposed film strip.

After having been peeled completely from the processing fluid reservoir 50, the tear tab 58 is typically disengaged from the pull strip 62 by a knife-like formation 86 at the exit 68 of the channel 70 formed by the internal cassette walls. The removed tear tab closure 58 remains stored within the cassette 10 once the processing cycle has been completed.

Upon completion of the processing operation, the processor nozzle 54 through which the processing fluid is passed to the film strip 30 is sealed off by a slidable valve member 88 which is utilized to close off the nozzle and terminate the processing operation when the film strip is completely rewound upon the film supply reel 26.

Turning now to the audio tape 32, it should first be noted that the latter is initially fully wound on the supply spool 26 and extends from a path to be further described hereinbelow to the takeup spool 28 where the other end is operatively coupled. FIG. 1 represents the condition of a cassette following exposure in a camera with all of the motion picture film strip 30 and the tape 32 wound upon the takeup spool 28. As is seen in this figure, the audio tape 32 passes from the cassette 10 through a tape exit opening 90 to a path exterior of the cassette housing and extends in a somewhat arcuate path to a cassette entry opening 92 where it re-enters the cassette and passes downwardly to the left of the takeup reel 28 around an arcuate guide surface 94 to a tape guide roller 100 which is positioned adjacent the snubber roller 38 and from there is guided by the roller 96 to the takeup reel 28. The audio tape exit and entry openings 90, 92 are defined by cut-out portions of the cassette top wall 22 and are shaped to define suitable low friction tape guide surfaces 96 and 94, respectively, thereat to facilitate smooth movement of the audio tape therethrough.

Suitable audio components which may be carried either by the photographic camera or the player or projector with which the cassette is to be used are represented by the box 101 labeled sound station components. Typical components contained therein include a sound drive capstan, a magnetic recording/playback head and also suitable means for establishing free isolation loops both before and after engagement of the strip with the magnetic pickup/recording head. The cassette 10 is further provided with a spring biased separator means 102 which is pivotally mounted in the upper right hand corner of the cassette and serves to assure separation of the magnetic tape from the film strip, particularly following deposition of the processing fluid on the film strip. An arrangement similar to that illustrated is shown and described in copending U.S. application Ser. No. 899,872.

As mentioned hereinabove, the cassette illustrated in FIG. 1 is in the condition which an exposed cassette is in immediately prior to going into the processing mode of operation. Accordingly, the pull strip 62 is resting upon the portion of the supply spool leader 78 which runs from the supply spool to the bobulator roller 31 and, at this time, the elongated aperture 72 which the pull strip latching configuration 71 will pass into and operatively engage is positioned along the length of the supply spool leader at a position further from the supply spool than the location of the latching configuration 71 of the pull strip 62. Accordingly, upon actuation of the player or projector to process the cassette, the supply spool 26 is driven in the rewind direction as shown by the arrow 104 in FIG. 1. Such actuation results in passage of the latching configuration 71 of the pull strip 62 through the aperture 72 in the film strip 30 and the desired latching therebetween. (FIG. 2 shows the pull strip latching configuration 71 as it has just entered the aperture 72). Continued advancement of the film, following latching, thus results in removal of the tear tab 58 from the initially sealed reservoir to initiate the flow of processing fluid to the nozzle 54 and to the film strip 30.

With reference now to both FIGS. 1 and 2, it will be seen that the magnetic tape 32 is attached to the film strip 30 itself rather than to the supply spool hub along with the film strip as is conventional. With reference particularly to FIG. 2, it will be seen that the audio tape 32 attachment 106 to the film strip 30 is at a given point, at the supply end of the film strip which is further along the length of the supply end of the film strip than the location of the pull strip engaging aperture 72 so that no portion of the audio tape 32 lies adjacent the film strip aperture 72 during the critical time of engagement of the pull strip with the aperture. Specifically as shown in both FIGS. 1 and 2, the attachment point 106 is located a predetermined distance "D" from the transverse slot 84 of the aperture 72.

As a result of the described engagement, no chance exists of the magnetic audio tape 32 interfering with the passage of the latching configuration into, and positive latching of the pull strip 62 with, the mating aperture 72 because the film strip 30 actually guides the trailing end portion 108 of the magnetic tape 32 along its own path as seen in FIG. 1, thereby completely removing that portion of the tape from any possible physical engagement or interference with this coupling.

Such removal of the magnetic tape from the region of the pull strip/film strip coupling has been found to alleviate any problems of interference which the magnetic tape could cause during this critical period of operation of the cassette.

As a result, the film strip and the pull strip remain, as in the prior embodiments, coupled to one another and thus still provide the important synchronization of the image and sound information while pulling or guiding the magnetic tape out of the region of the pull strip/film strip engagement. Accordingly, it should be appreciated that means have been provided for assuring no interference between the engagement of a film processor actuating pull strip and a mating aperture provided in the film strip in a multipurpose film cassette of the type employing a film strip and an audio information bearing strip interwound on a pair of common spools and where it is desired to have the audio tape out of the region adjacent the film strip aperture during the engagement of the pull strip with the film strip.

This invention may be practiced or embodied in still other ways without departing from the spirit or essential character thereof. The preferred embodiment described herein is therefore illustrative and not restrictive, the scope of the invention being indicated by the appended claims and all variations which come within the meaning of the claims are intended to be embraced therein.

What is claimed is:

1. A multipurpose audio-visual photograhic film handling cassette of the type having a strip of photographic film to be exposed and processed without removal from the cassette, the film being connected at opposite ends to supply and takeup spools for advancement from one of said spools to the other, the cassette including processing means initially sealed by a tear tab which may be removed by advancement thereof upon completion of film exposure so as to release reservoir-contained processing fluid for deposit on the film strip, the tear tab including a latching formation at a free end thereof configured to pass through and interlock with a necked-down aperture provided in the film strip, the aperture being located near the end of the film strip attached to the supply spool; the cassette further including an audio tape interwound with the film strip upon the supply and takeup spools for advancement from one of said spools to the other along with the film strip; the improvement wherein the audio tape is coupled to the film strip at a given point, at the supply spool end of the film strip, further along the length of the supply end of the film strip than the location of the pull strip engaging aperture so that no audio tape lies adjacent the film strip aperture during the engagement of the pull strip with the aperture.

2. A film strip and audio tape assembly for use with a multipurpose audio-visual photographic film handling cassette of the type wherein a strip of photographic film to be exposed and processed without removal from a cassette is connected at opposite ends to supply and takeup spools for advancement from one of the spools to the other, the cassette including processing means having a processor actuating tear tab which may be advanced to activate the processing means upon completion of film exposure so as to release reservoir-contained processing fluid for deposit on the film strip, the processor actuating tab including a latching formation at a free end thereof configured to pass through and interlock with a necked-down aperture provided in the film strip, the aperture being located near the end of the film strip attached to the supply spool; the cassette further including an audio tape interwound with the film strip upon the supply and takeup spools for advancement from one of the spools to the other along with the film strip, the film strip and audio tape assembly comprising an elongated flexible strip of photographic film having means at opposite ends thereof to couple the opposite ends of the film strip to the supply and takeup spools, said film including a tear tab engaging aperture near the supply spool end thereof, and said audio tape comprising an elongated flexible strip of audio information bearing material being configured at one end to be coupled to said film strip, adjacent the supply spool end of said film strip at a point spaced just further from said supply spool end of the film strip than the location of the tear tab engaging aperture so that no audio tape lies adjacent the film strip aperture during the engagement of the pull strip with the aperture.

* * * * *